United States Patent [19]
Seddon

[11] Patent Number: 5,992,294
[45] Date of Patent: Nov. 30, 1999

[54] HYDRAULIC VALVES AND SYSTEMS

[75] Inventor: Don Seddon, Hayling Island, United Kingdom

[73] Assignee: Smiths Industries Public Limited Company, London, United Kingdom

[21] Appl. No.: 09/076,846

[22] Filed: May 13, 1998

[30] Foreign Application Priority Data

May 23, 1997 [GB] United Kingdom .................... 9710529

[51] Int. Cl.⁶ .................................................. F15B 11/10
[52] U.S. Cl. .................................. 91/433; 91/527; 91/528; 192/85; 192/103 F
[58] Field of Search ............................... 91/433, 525, 527, 91/528, 536; 192/133 F, 85; 137/625.48, 625.46, 625.69, 625.61

[56] References Cited

U.S. PATENT DOCUMENTS

| | | | |
|---|---|---|---|
| 3,715,017 | 2/1973 | Jenney | 91/528 X |
| 3,757,822 | 9/1973 | Kell | 91/536 X |
| 3,818,800 | 6/1974 | Berteaux | 91/459 X |
| 3,951,166 | 4/1976 | Whitener . | |
| 4,294,287 | 10/1981 | Boswell | 91/536 X |
| 5,184,643 | 2/1993 | Raymond . | |
| 5,240,041 | 8/1993 | Garnjost | 91/433 X |
| 5,251,535 | 10/1993 | Lacher et al. | 91/459 X |
| 5,251,671 | 10/1993 | Hiroki | 91/433 X |
| 5,564,274 | 10/1996 | Denbraber et al. | 91/459 X |

FOREIGN PATENT DOCUMENTS

| | | |
|---|---|---|
| 1229710 | 4/1971 | United Kingdom . |
| 1283950 | 8/1972 | United Kingdom . |
| 1412393 | 11/1975 | United Kingdom . |
| 1514985 | 6/1978 | United Kingdom . |

*Primary Examiner*—Hoang Nguyen
*Attorney, Agent, or Firm*—Pollock, Vande, Sande & Amernick

[57] ABSTRACT

An hydraulic valve has two outlets and is switchable so that fluid can only be supplied to one outlet at a time. A spool with two seals is slidable in a housing under the action of two proportional solenoids and is urged to a central position by two springs where the seals block passage to both outlets. When the spool is moved in one direction it allows flow to one outlet and also allows flow via a bypass channel to an opposite side of the spool counteracting the force applied by the solenoid so that the force applied to an outlet can be controlled gradually.

6 Claims, 2 Drawing Sheets

HYDRAULIC VALVES AND SYSTEMS

BACKGROUND OF THE INVENTION

This invention relates to hydraulic valves and to systems including such valves.

Hydraulic systems are used extensively to control the engagement of a clutch in a gearbox connecting the output shaft of an engine to its driven machinery, especially in heavy load applications, such as marine engines or an earth moving plant. The hydraulic system includes an electrically-operated or mechanically-operated valve, which enables or prevents flow of hydraulic fluid from a pump to an hydraulic clutch actuator. Where the gearbox has two clutches, such as for forward and reverse drive, two valves are used to supply hydraulic fluid to one or the other of the clutch actuators. The valves are arranged in such a way that only one can be open at any time, so as to prevent both clutches being engaged at the same time. Such valves can only adopt an open or closed state. This can be a disadvantage since it can be useful to be able to control the application of a variable hydraulic pressure to the clutch actuator, to enable it to be gradually engaged or disengaged, or to be partially engaged. There are other applications where it can be an advantage to be able to control the application of a variable hydraulic pressure to an hydraulic actuator.

BRIEF SUMMARY OF THE INVENTION

It is an object of the present invention to provide an improved hydraulic valve and system.

According to one aspect of the present invention there is provided an hydraulic valve having a housing with a fluid pressure inlet, first and second fluid pressure outlets, a displaceable member within the housing, and means for displacing the member within the housing to control the flow of fluid to one or the other of the fluid pressure outlets, the valve being arranged such that fluid pressure can only be supplied to one of the outlets at any time The displaceable member is preferably a spool displaceable along its length within the housing, the means for displacing the displaceable member including first and second actuator means located at opposite ends of the housing for displacing the spool in opposite directions, the valve including first and second seal members on the spool, a third seal member on the housing arranged to cooperate with the first seal member, a fourth seal member on the housing arranged to cooperate with the second seal member, the fluid pressure inlet opening between the third and fourth seal members, the first outlet opening in the housing on a side of the third seal member remote from the inlet, the second outlet opening in the housing on a side of the fourth seal member remote from the inlet, and the valve being arranged such that when the spool is in a first position the first and second outlets are isolated from the inlet, when the spool is displaced to a second position by one of the actuator means only the first outlet is connected with the inlet and when the spool is displaced in the opposite direction to a third position only the second outlet is connected with the inlet. The hydraulic valve preferably has first and second bypass channels arranged to supply fluid pressure from the first and second outlets to respective opposite ends of the spool such as to apply a force to the spool acting to reduce fluid flow to the first or second outlet. The valve may include a third and fourth outlet arranged to be connected to a reservoir, the third and fourth outlets being connected within the housing to the first and second outlets respectively via further seals on the housing arranged to cooperate with the first and second seals such that there is a fluid passage between the third outlet and the first outlet, and between the fourth outlet and the second outlet when the spool is in the first position. The valve preferably includes resilient means acting to urge the displaceable member to a first position in which fluid is prevented flowing from the inlet to either the first or second outlet. The means for displacing the displaceable member may have a member projecting from the housing for manual operation. The means for displacing the displaceable member may include a proportional solenoid.

According to a further aspect of the present invention there is provided an hydraulic system including an hydraulic valve according to the above one or other aspect of the invention.

The system may include a forward and reverse drive clutch actuator, the first and second outlets being connected to the forward and reverse drive clutch actuators respectively.

An hydraulic clutch control system including an hydraulic valve, according to the present invention, will now be described, by way of example, with reference to the accompanying drawings.

DETAILED DESCRIPTION OF THE PREFERRED EMBODIMENT

Figure 1:
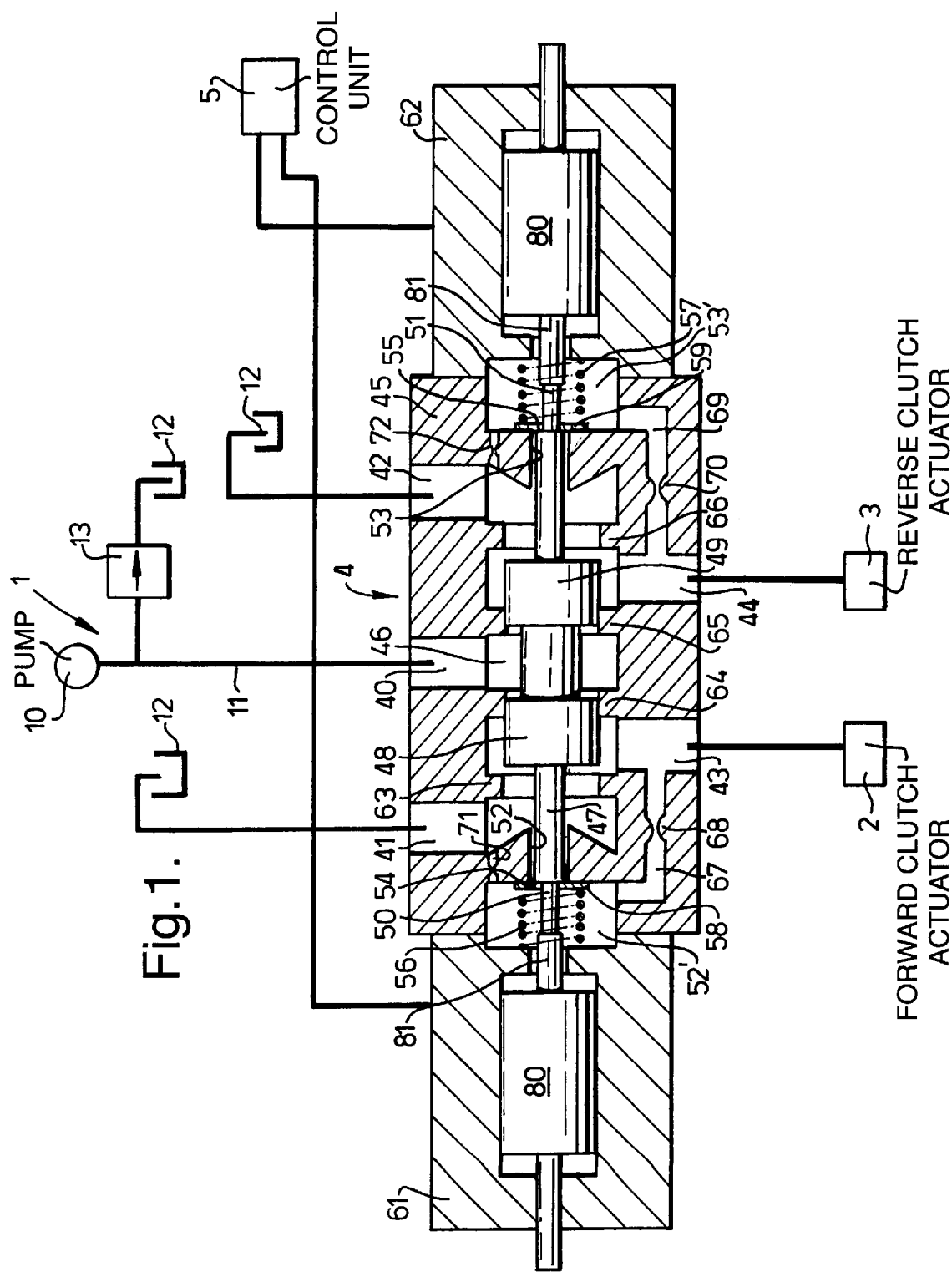
FIG. 1 shows the system schematically.
Figure 2:
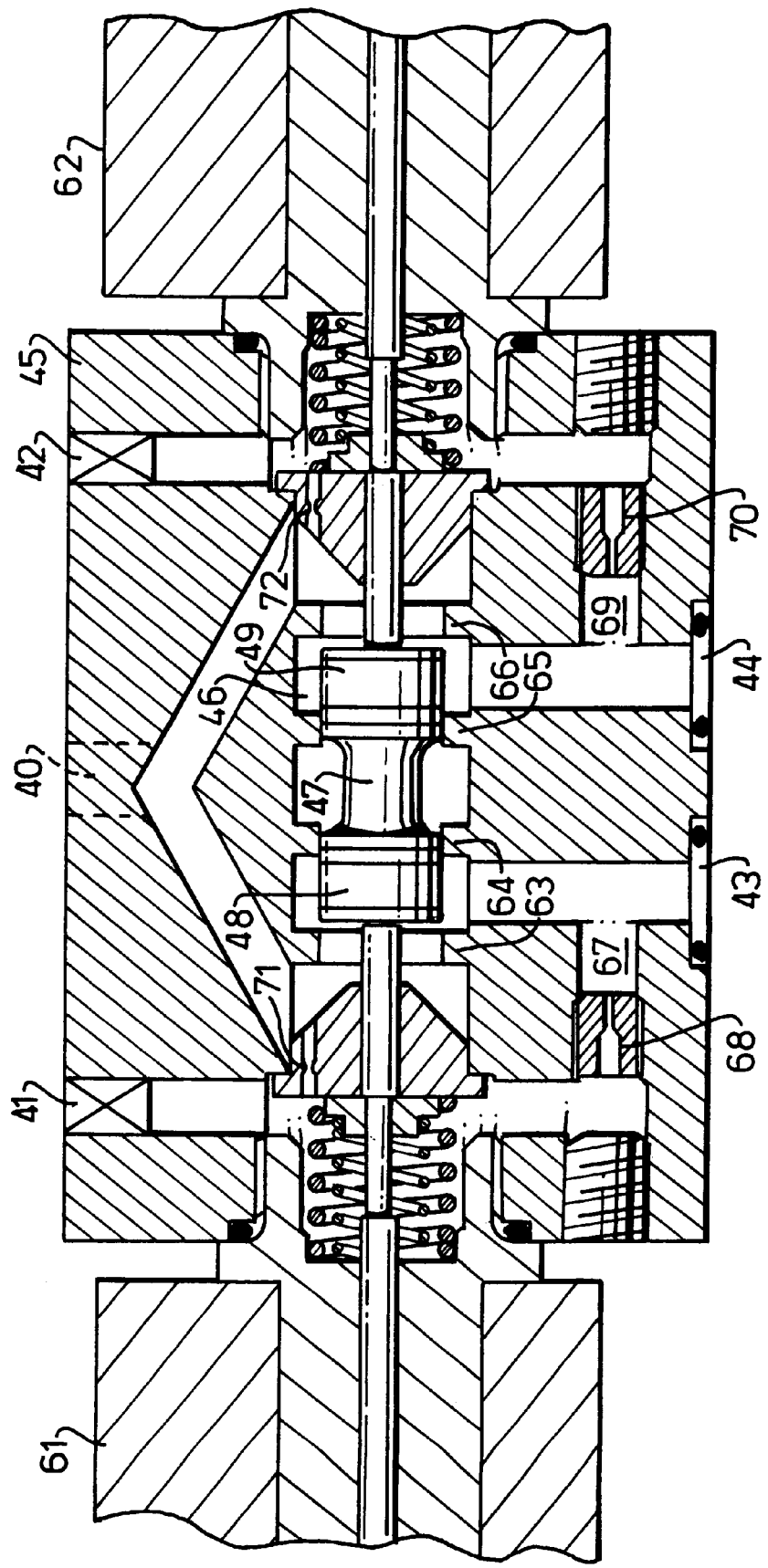
FIG. 2 shows the construction of the valve in more detail.

The system comprises a fluid pressure supply 1, a forward drive hydraulic clutch actuator 2, a reverse drive hydraulic clutch actuator 3, an hydraulic valve 4 connected between the supply and the clutch actuators, and an electrical control unit 5 for controlling operation of the valve. The valve 4 is arranged such that it can apply a controlled pressure to either the forward or reverse clutch actuators 2 or 3 but the construction of the valve ensures that it is impossible to supply pressure to both actuators at the same time. The system could be used to supply pressure to other forms of actuator, such as for selecting between different gears in a gear box.

The fluid pressure supply 1 comprises a pump 10 connected at its output to a supply line 11. The supply line 11 is connected to an inlet port 40 of the valve 4 and is also connected to a reservoir or tank 12 via a relief valve 13. The pump 10 supplies fluid at a pressure greater than the setting of the relief valve 13 so that there is a continuous flow of fluid to the reservoir 12 and a constant pressure is maintained at the inlet port 40.

The valve 4 has four outlets 41 to 44. Two of the outlets 41 and 42 are connected directly to the reservoir 12, so as to enable fluid to flow from the valve to the reservoir. The other two outlets 43 and 44 are connected to the forward and reverse clutch actuators 2 and 3 respectively. The valve 4 has a tubular housing 45 with an axial bore 46 containing a slidable spool 47. The spool 47 has two cylindrical seals 48 and 49 axially spaced from one another on either side of the center of the spool. The left-hand end 50 and the right-hand end 51 of the spool 47 project through respective apertures 52 and 53 at opposite ends of the housing 45 into respective recesses 52' and 53'. The ends 50 and 51 are reduced in diameter to form respective annular shoulders 54 and 55, which align with the outer ends of the apertures 52 and 53 when the spool 47 is located midway along the bore 46. Two helical springs 56 and 57 extend coaxially of the ends 50 and 51 of spool 47 where they project through the apertures 52 and 53. One end of each spring 56 and 57 engages a respective flange 58 and 59 slidably located on the ends 50 and 51 of the spool. The opposite ends of the springs 56 and 57 engage a face of a housing of a respective electric actuator in the form of solenoids 61 and 62 attached to opposite ends of the valve housing 45. The springs 56 and 57 urge the spool 47 to the position shown where it is located midway along the bore 46.

The bore 46 of the valve housing 45 has four annular sealing rings 63 to 66 spaced axially from one another along the bore to cooperate with the seals 48 and 49 on the spool 47. The two central sealing rings 64 and 65 are located on opposite sides of the inlet 40 with the two clutch actuator outlets 43 and 44 being located on sides of the sealing rings remote from the inlet. With the spool 47 in a first, central position, the right end of the left-hand spool seal 48 engages the left-hand central sealing ring 64 about half way along its length; and the left end of the right-hand spool seal 49 engages the right-hand sealing ring 65 about half way along its length. In this position, therefore, the spool 47 prevents flow from the inlet 40 to any of the outlet ports 41 to 44. The left-hand sealing ring 63 and the left central ring 64 are located on opposite sides of the outlet port 43 that communicates with the forward clutch actuator 2, the left-hand sealing ring 65 being located on the right of the left-hand outlet 41 that communicates with the reservoir 12. Similarly, the right-hand sealing ring 66 is located between the outlet 44 that communicates with the reverse clutch 3 and the right-hand outlet 42 that communicates with the reservoir 12. The spacing of the sealing rings 63 and 66 is such that, with the spool 47 in the central position shown, there is a flow passage between the left-hand sealing ring 63 and the left-hand end of the left spool seal 48, and another flow passage between the right-hand sealing ring 66 and the right-hand end of the right spool seal 49. The forward clutch actuator 2 is, therefore, connected to the left-hand outlet 41, and the reverse clutch actuator 3 is connected to the right-hand outlet 42.

The valve housing 45 also has a bypass channel 67 from the forward clutch outlet port 43 to the recess 52' at the left-hand end of the housing, the channel containing a restriction orifice 68. Similarly, the housing 45 has a bypass channel 69 at its right-hand end connecting the reverse clutch outlet port 44 with the recess 53' at the right-hand end of the housing, the channel containing a restriction orifice 70.

The two solenoids 61 and 62 are both of the proportional kind, having an armature 80 producing an axial force proportional to the electric current applied to the solenoid windings. The solenoids 61 and 62 are mounted axially at opposite ends of the valve housing 45 and each has a shaft 81 fixed with the armature 80, which projects axially in abutment with opposite ends of the spool 47.

In the position shown, with no current applied to either solenoid 61 or 62, the springs 56 and 57 keep the spool 47 in a first, central position in which both clutch actuators 2 and 3 are isolated from hydraulic pressure. The hydraulic pressure applied at the inlet 40 acts equally on the right-hand face of the left spool seal 48 and on the left-hand face of the right spool seal 49 so there is no resultant force from the hydraulic supply 1 acting on the spool 47.

When the user wishes to engage the forward clutch 2, he switches the control unit 5 so that it applies current to the right-hand solenoid 62 causing its armature 80 to move to the left. The armature 80 moves the spool 47 to the left by the same distance and compresses the spring 56, the flange 58 being carried on the shoulder 54. As the left-hand seal 48 moves to the left, it reduces the size of the fluid passage between its left-hand edge and the sealing ring 63. When the seal 48 just overlaps the ring 63, the passage is closed and the forward clutch outlet 43 is isolated from the reservoir outlet 41. In this position, the right-hand end of the spool seal 48 still overlaps the sealing ring 64 so there is no flow from the inlet 40 to the outlet 43. Further movement of the spool 47 to the left displaces the right-hand edge of the seal 48 to the left of the sealing ring 64, thereby opening a passage between the inlet 40 and the forward clutch outlet 43 and causing pressure in the outlet to rise. In this second, left-hand position of the spool 47, pressure at the outlet 43 is also communicated to the recess 52' via the bypass channel 67 where it acts on the shoulder 54 of the spool 47 in a direction opposite from the force applied by the solenoid 62. As pressure in the outlet 43 builds up, the counteracting pressure on the spool 47 also increases until it is sufficient to move the spool to the right, against the action of the solenoid. The area of the shoulder 54 is relatively small so that the counteracting hydraulic pressure on the spool 47 is not large, thereby enabling the use of a relatively small solenoid. The friction between the spool 47 and the bore 46, and the restriction orifice 68 in the bypass channel 67 damps movement of the spool so that it takes up a stable position along the bore. A bleed passage 71 is formed between the recess 52' and the reservoir outlet 41 to reduce pressure in the recess; a similar bleed passage 72 is formed between the opposite recess 53' and the reservoir outlet 42. By controlling the size of these bleed passages 71 and 72 relative to that of the orifices 68 and 69, the pressure in the recesses 52' and 53' can be controlled to a fixed proportion of the pressure in the outlet ports 43 and 44.

If the current applied to the solenoid 62 is increased, this will displace the spool 47 further to the left, thereby increasing pressure at the forward clutch outlet 43. Pressure at this outlet 43 is, therefore, dependent on the current applied to the solenoid 62. This enables the pressure applied by the forward clutch actuator 2 to be controlled sufficiently for the clutch to be gradually engaged or disengaged and for it to be partially engaged or slipped, if desired.

It can be seen that for all positions of the spool 47 to the left of center, the right-hand spool seal 49 will maintain a sealing engagement with the right center sealing ring 65, thereby preventing any flow of hydraulic fluid from the inlet 40 to the reverse clutch outlet 44.

When power supply to the solenoid 62 is terminated, either intentionally or because of a failure, the spring 56 will move the spool 47 back to the central position, thereby allowing pressure at the outlet port 43 to flow back to the reservoir 12 via the outlet 41. The fall in pressure at the outlet port 43 allows the forward clutch to disengage.

When the user wishes to engage the reverse clutch 3, he switches the control unit 5 to apply current to the left-hand solenoid 61. This displaces the spool 47 to a third, right-hand position in which the left-hand edge of the seal 49 lies to the right of the sealing ring 65. This causes pressure to build up in the outlet 44 and increases in pressure in the recess 53', via the bypass channel 69, until the spool 47 achieves a stable position.

The outer end of the shaft 81 of both solenoid armatures 80 projects from the ends of the solenoid casings so that the armature, and hence the spool 47, can be pushed in manually, if desired, to control the clutch actuators 2 or 3, should the solenoids or their electrical supply fail.

The valve of the present invention enables two different fluid-pressure responsive devices, such as clutch actuators, to be controlled separately by a single valve. The valve ensures that hydraulic fluid can only be supplied to one outlet at a time, making it safe to use in applications where this is important. The valve also has the advantage that the same device provides both control of directional flow of hydraulic fluid and control of the pressure of the fluid.

What I claim is:

1. An hydraulic valve comprising: a housing having a fluid pressure inlet and first and second fluid pressure outlets; a spool within said housing; a proportional solenoid connected with said spool for displacing said spool within said housing to control the flow of fluid to one or other of said fluid pressure outlets, a control unit connected to supply an electrical signal to said solenoid, said proportional solenoid being arranged to displace said spool to a position dependent on the magnitude of the signal from said control, unit said valve being so arranged that fluid pressure can only be supplied to one of said outlets at any time; a first bypass channel extending from said first outlet to apply fluid pressure to one end of said spool, and a second bypass channel extending from said second outlet to apply fluid pressure to an opposite end of said spool, such that the fluid pressure applied to said spool via said bypass channels acts against pressure exerted on said spool by said proportional solenoid to damp movement of said spool.

2. An hydraulic valve according to claim 1 including a spring acting to urge said spool to a first position in which fluid is prevented flowing from said inlet to either said first or second outlet.

3. An hydraulic valve according to claim 1, wherein said solenoid has a member projecting from said housing for manual operation.

4. An hydraulic valve comprising: a housing having a fluid pressure inlet and first and second fluid pressure outlets; a spool displaceable along its length within said housing; first and second proportional solenoids located at opposite ends of said housing and connected with opposite ends of said spool, such that said spool can be displaced by such solenoids in opposite directions; first and second seal members on said spool; a third seal member on said housing arranged to cooperate with said first seal member; a fourth seal member on said housing arranged to cooperate with said second seal member, and a control unit for supplying an electrical signal to said solenoids, wherein said fluid pressure inlet opens between said third and fourth seal members, wherein said first outlet opens in said housing on a side of said third seal member remote from said inlet, wherein said second outlet opens in said housing on a side of said fourth seal member remote from said inlet, wherein said valve is arranged such that when said spool is in a first position said first and second outlets are isolated from said inlet, when said spool is displaced to a second position by one of said proportional solenoids only said first outlet is connected with said inlet, and when said spool is displaced in the opposite direction to a third position only said second outlet is connected with said inlet, said proportional solenoids being arranged to displace said spool to a position dependent on the magnitude of the signal from said control unit, and wherein said valve includes a first bypass channel extending from said first outlet to apply fluid pressure to one end of said spool, and a second bypass channel extending from said second outlet to apply fluid pressure to an opposite end of said spool, such that the fluid pressure applied to said spool via said bypass channels acts against pressure exerted on said spool by said proportional solenoids to damp movement of said spool.

5. An hydraulic valve according to claim 4 including a third and fourth outlet arranged to be connected to a reservoir, two further seals on said housing located to cooperate with said first and second seals, wherein said third and fourth outlets are connected within said housing to said first and second outlets respectively via said further seals such that there is a fluid passage between said third outlet and said first outlet, and between said fourth outlet and said second outlet when said spool is in said first position.

6. An hydraulic valve comprising: a housing having a fluid pressure inlet arranged for connection to a supply of fluid, and four fluid pressure outlets, a first and second of said outlets being arranged for connection to hydraulic devices, and a third and fourth of said outlets being arranged for connection to a reservoir; a spool displaceable along its length within said housing; a proportional solenoid arrangement connected with said spool for displacing said spool in opposite directions, a control unit connected to supply an electrical signal to said proportional solenoid arrangement such that said spool is displaced by said proportional solenoid arrangement to a position dependent on the magnitude of the signal from said control unit; first and second seals on said spool; four seals on said housing spaced from one another along said housing, one seal being located between said first outlet and said third outlet, another seal being located between said inlet and said second outlet, a third seal being located between said inlet and said third outlet, and a fourth seal being located between said third and fourth outlets, said first and second seals on said spool being arranged to cooperate with said four seals on said housing such that when said spool is in a first position said first and second outlets are isolated from said inlet and are connected with said third and fourth outlets respectively, when said spool is displaced to a second position said first outlet is connected with said inlet and is isolated from said third outlet, and when said spool is displaced in the opposite direction to a third position said second outlet is connected with said inlet and is isolated from said fourth outlet, said valve including a first bypass channel extending from said first outlet to apply fluid pressure to one end of said spool, and a second bypass channel extending from said second outlet to apply fluid pressure to an opposite end of said spool, such that the fluid pressure applied to said spool via said bypass channels acts against pressure exerted on said spool by said proportional solenoids to damp movement of said spool.

* * * * *